Nov. 13, 1951  K. K. HORNER ET AL  2,575,221
SEAT STRUCTURE WITH REMOVABLE BACK
Filed Jan. 19, 1946
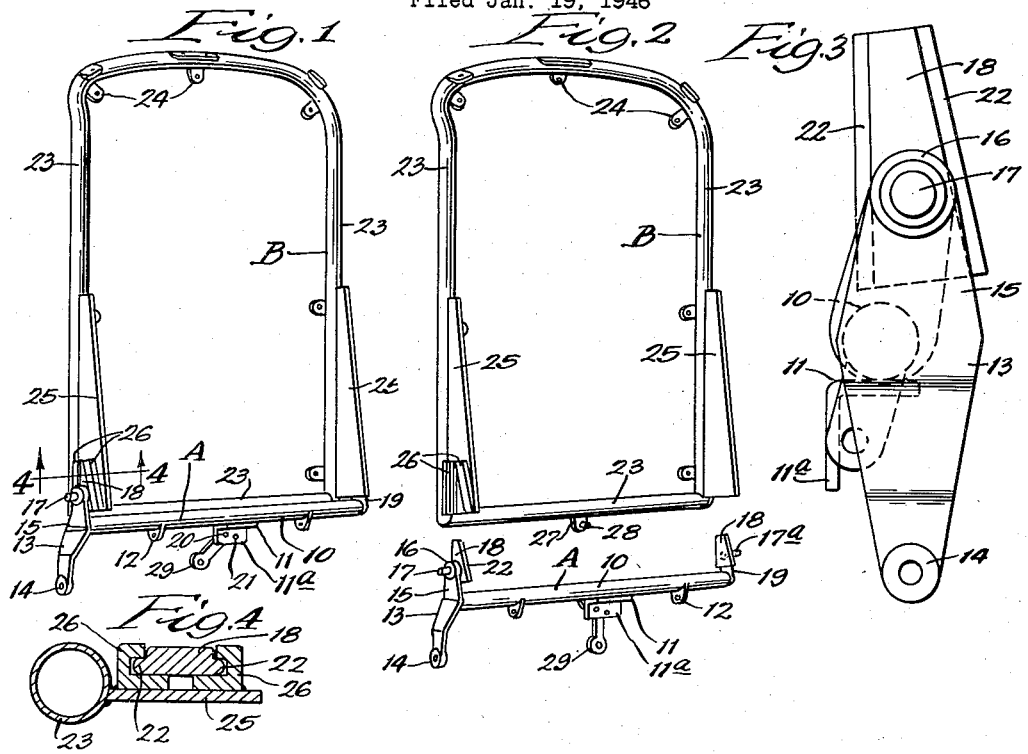
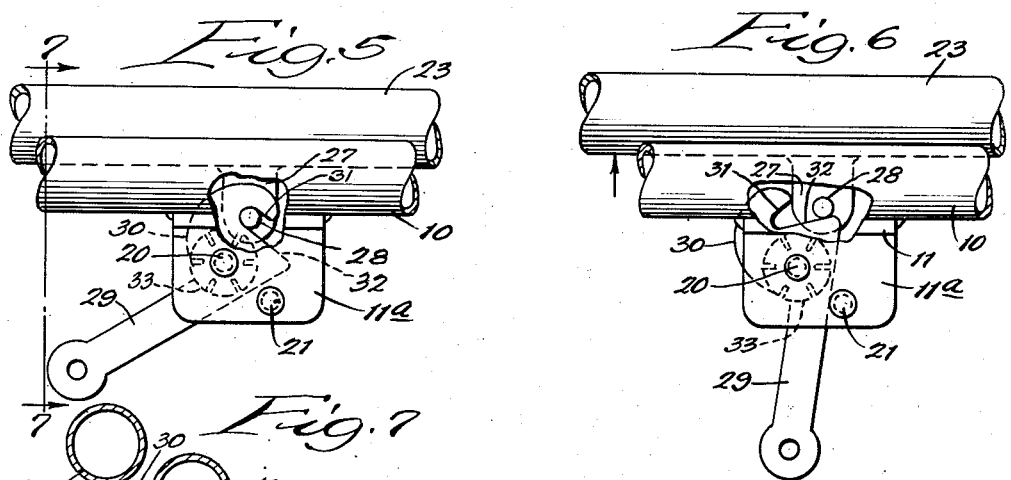
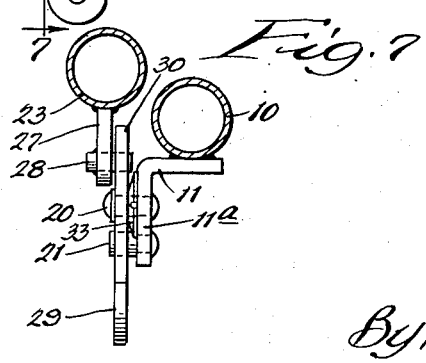
Inventors:
Kenneth K. Horner and
Laurence W. Hittman,
By Dawson Booth and Spangenberg,
Attorneys.

Patented Nov. 13, 1951

2,575,221

UNITED STATES PATENT OFFICE 2,575,221

SEAT STRUCTURE WITH REMOVABLE BACK

Kenneth K. Horner, Chicago, and Laurence W. Hiltman, Palos Heights, Ill., assignors, by mesne assignments, to International Furniture Company, a corporation of Illinois Application January 19, 1946, Serial No. 642,307

3 Claims. (Cl. 155—5)

This invention relates to a seat structure with removable back. The invention is particularly useful in connection with railway car seats, bus seats, aeroplane seats, and for similar uses.

An object of the invention is to provide a seat structure in which a back may be detachably connected in such a manner as to maintain it firmly in position without vibrating or rattling while, at the same time, enabling it to be readily removed for cleaning purposes, repair, and the like. A further object is to provide a seat with a removable back which may be secured rigidly to the seat and locked in position while, at the same time, providing means for the ready removal of the back. A further object is to provide a seat structure in which a back frame may be readily secured together with means for locking the seat back in position and for partially releasing the back, when desired, in the back removing stage. A further object is to provide a seat lock which can be installed in either side of seat. Other specific objects and advantages will appear as the specification proceeds.

In the illustration given, Figure 1 is a perspective view of a portion of a seat structure equipped with a removable back; Fig. 2, a view similar to Fig. 1 but showing the back removed from the other structure; Fig. 3, an enlarged side view in elevation of the seat structure and means carried thereby for supporting the back; Fig. 4, a transverse sectional view, the section being taken as indicated at line 4 of Fig. 1; Fig. 5, a broken rear view in elevation of the locking and releasing structure employed and showing the back frame in locked position; Fig. 6, a view similar to Fig. 5 but showing the structure in unlocked position and with the back frame partially separated from the seat frame; and Fig. 7, a transverse sectional view, the section being taken as indicated at line 7 of Fig. 5.

In the illustration given, A designates a portion of a permanent seat frame and B a removable back frame secured to frame A.

The structure A may be regarded as part of the seat frame structure because it remains fixed to the seat structure and is not removable, as is the back frame structure B. The structure A comprises a tube member 10 provided centrally with a depending angle iron member which is welded to the tube 10. At the end of the tube 10 on one side is a lever member 13 fixed to tube 10 by welding or other suitable means. The member 13 has a depending arm portion 14 adapted to be engaged for tilting the structure A. The member 13 has an upwardly extending portion 15 equipped with a boss 16 receiving a pivot pin 17. Wedge 18 is secured to 15 by welding. Pin 17 is secured to 18 by welding. A similar wedge block 18 is carried by an arm 19 secured to the opposite end of tube 10. The arm 19 is provided with a pivot pin 17ª and the pivot pins 17 and 17ª are adapted to be received in sockets of the chair frame (not shown) for pivotally supporting the frame structure A.

The frame A is a portion of a permanent seat frame employed for railway cars and the like and is of well-known construction. The angle iron member 11, which is secured to the central portion of shaft 10 has its vertical leg 11ª perforated to receive a pivot pin 20 and a stop pin 21, as will be described hereinafter.

The wedge block 18 is preferably of the tapered shape illustrated in Fig. 3, and is provided with a reduced edge portion 22, as shown more clearly in Figs. 3 and 4.

The removable back frame B may be of any suitable form or construction. In the illustration given, there is a tubular frame 23 formed in the desired seat back shape and with spaced members 24 for securing spring or other supporting structure within the seat back. It will be understood that the entire frame 23 will be covered with the usual fabric and cushion structure as in normal practice.

To the forward edge portion of the frame 23 at the lower sides thereof are secured the web members 25, preferably of the shape indicated, but it will be understood that any suitable shape may be employed to meet the requirements of the type of seat desired. To the outer side of each of the web members 25 are secured the spaced socket members 26, as shown more clearly in Fig. 4. The socket provided is a tapered one and is adapted to receive the tapered wedge block 18 of the member 10 anchored within the seat frame. The lower portion of the frame 23 is provided with a depending plate 27 carrying a pin 28.

Means are provided in the new structure for locking the pin 28 of plate 27 to the vertical leg 11ª of the angle iron 11. In the illustration given, the locking means comprises a lever 29 carried by the pivot pin 20 and engaged on one side by the stop pin 21. The lever 29 is provided with a depending arm portion adapted to be grasped or engaged by a pull member for actuating the lever member. The upper end of the member 29 is provided with a head 30 having a hook portion 31 adapted to engage the pin 28 and as the handle of member 29 is swung upwardly to pull the pin 28 in a downward direction. The head 30 is also provided with a cam surface 32 adapted to engage the pin 28 and to press it upwardly when the handle of member 29 is swung downwardly to the position shown in Fig. 6. A split spring washer 33 is shown between the vertical leg 11a of angle iron member 11 and the lever 29, so as to maintain the lever 29 in the position to which it may be swung.

*Operation*

In the operation of the structure when it is desired to remove the back B for cleaning the fabric or cushion or for repair, etc., the lever arm 29 is swung downwardly to the position shown in Fig. 6 so that the cam surface 32 presses the pin 28 and thereby plate 29 and frame 26 upwardly. This movement frees the wedge block 18 from its tight connections with the socket member 26 and enables the frame 23 to be easily lifted from the permanent structure 10.

After the seat back has been cleaned, repaired, etc., it may be readily restored to a position in either side of the seat by dropping the back, as shown in Fig. 2, so that the sockets 27 receive the wedge blocks 18. The weight of the back tends to wedge the sockets 26 tightly about the blocks 18, as indicated in Fig. 4, but, in order to draw the seat evenly over the blocks and provide a rigid inter-lock, the lever 29 is swung upwardly to the position shown in Fig. 5 whereby the hook portion 31 engages pin 28 and thus provides a camming surface for drawing the pin 28 downwardly toward the shaft 10, as illustrated best in Fig. 5. Shaft 29 is maintained in its locking position by virtue of the gripping action between the hook 31 and pin 28 as well as by the friction washer 39.

While we have shown the removable back frame secured to the tiltable portion of the seat structure, it will be understood that the method and means disclosed may be applicable to other portions of the seat structure in a manner obvious to mechanics in this field.

The new seat and frame cooperative arrangement illustrated has the advantages of quick assembly with tightening means for producing an even or balanced adjustment of the interlocking members and in such tight relationship that long or extensive friction surfaces are not necessary while, at the same time, providing means for the quick disassembly of the parts through the swinging of a camming lever. Further, the single lever employed discharges both functions, namely the drawing of the interlocking members evenly together by means of the force-distributing frame connection while also separating the two connecting means evenly by the application of camming force to the frame at a point midway between the sockets 26 or web members 25.

While in the foregoing description, we have set forth a detailed structure as illustrative of one mode of use of the invention, it will be understood that such details may be widely varied by those skilled in the art without departing from the spirit of our invention.

We claim:

1. In a seat structure, a frame member having upwardly-turned ends, tapered blocks carried by the upper ends of said frame member, an oblong seat back member of generally tubular structure, web members secured to the lower ends of said seat back member, and spaced members on each of said web members providing a tapered socket adapted to receive said tapered blocks of said frame member to releasably confine the seat back frame upon said frame member.

2. In a seat structure, a frame member equipped with friction connections, a seat back frame equipped with friction connections adapted to releasably engage the connections of said frame member to releasably secure the back frame upon said first mentioned frame, means carried by said frame members for drawing said frame members together and for separating said frame members, said means including a lever swingable in one direction to release said frame members and in the opposite direction to draw said frame members together, and spring means for confining said last mentioned means at either extremity of its movement.

3. In a seat structure, a tubular frame adapted to be mounted upon a base for rotation therein, said frame member being provided at its outer ends with friction connections, a seat-back frame equipped with friction connections adapted to releasably engage the connections of said first-mentioned frame member for releasably securing the back frame upon said first-mentioned frame, means carried by said frame members for drawing said frame members together and for separating said frame members, said means including a lever swingable in one direction to release said frame members and in the opposite direction to draw said frame members together, and spring means for confining said last-mentioned means at either extremity of its movement.

KENNETH K. HORNER.
LAURENCE W. HILTMAN.

REFERENCES CITED

The following references are of record in the file of this patent:

UNITED STATES PATENTS

| Number | Name | Date |
|---|---|---|
| 263,329 | Flagg | Aug. 29, 1882 |
| 1,009,902 | Hanson | Nov. 28, 1911 |
| 1,469,719 | Dobson | Feb. 20, 1922 |
| 1,629,438 | Dake | Aug. 11, 1922 |
| 1,714,891 | Richardson | June 24, 1926 |
| 1,747,717 | Hummert | May 4, 1927 |
| 2,098,456 | Leader et al. | Nov. 5, 1937 |
| 2,283,485 | Beck | Aug. 28, 1939 |
| 2,297,176 | Thompson | Sept. 29, 1942 |